July 18, 1967
M. WALTERS
3,331,387
FLOAT CONTROL MEANS FOR USE IN WATER CLOSETS AND THE LIKE
Filed June 24, 1964
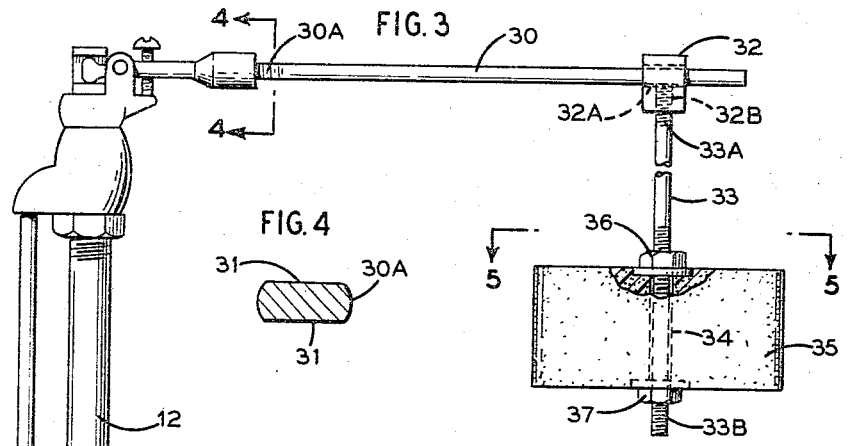
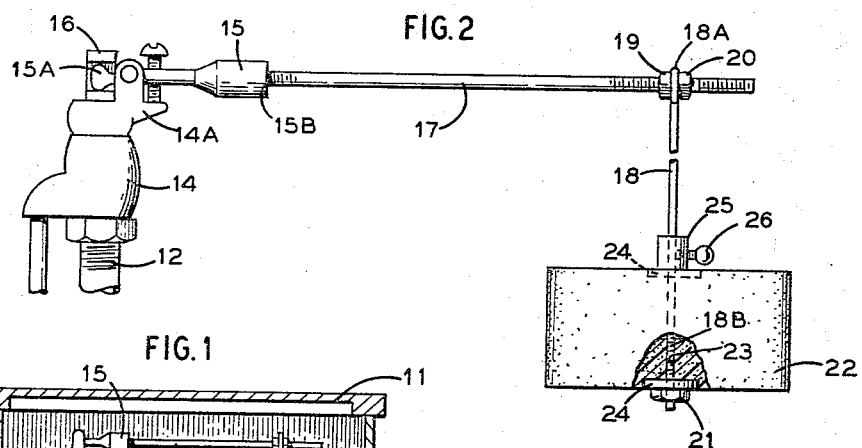
INVENTOR.
Manuel Walters
BY
ATTORNEY

United States Patent Office 3,331,387
Patented July 18, 1967

3,331,387
FLOAT CONTROL MEANS FOR USE IN WATER
CLOSETS AND THE LIKE
Manuel Walters, Mahwah, N.J.
(48–112 Park Lane, De Bary, Fla. 32718)
Filed June 24, 1964, Ser. No. 377,555
1 Claim. (Cl. 137—426)

This invention relates in general to improvements in water closets, and more specifically to an improved float control for use in such water closets.

It has been observed that many of the water closets in common use today utilize more water than is absolutely necessary to flush a toilet bowl in conjunction therewith. For this reason, a considerable amount of water is needlessly wasted. In areas where water is scarce or at a premium, this needless use of water constitutes a serious and unnecessary waste. Since the amount of water in closets commonly in use in such areas cannot be readily controlled or adjusted to that absolutely needed, this needless waste of water continues without correction or abatement. In all probability, such waste is not even recognized.

This condition of waste is further aggravated in that the inherent construction of the fixtures commonly in use in such water closets today is such that they frequently malfunction in a manner which hangs up the float. When this occurs, a continuous flow or loss of water to the bowl results. Consequently, such a loss of water may continue for hours before it is noted and corrected, resulting in a loss of untold gallons of water. Also the float commonly used for a control in water closets generally comprises a hollow ball formed of copper or plastic. However, such ball floats, due to wear or corrosion frequently spring leaks. When this occurs, the operation of the closet water control fixtures are adversely affected.

Therefore, an object of this invention is to provide an improved float control for use in water closets which can be readily adjusted to control the water level to the amount absolutely necessary to flush bowls used in conjunction therewith.

Another object of this invention is to provide an improved float construction for use in water closets which is relatively simple in construction, relatively inexpensive to manufacture, and positive and troublefree in operation.

Another object of this invention is to provide an improved float construction which can be rendered readily adapted to the existing water closet fixtures.

Another object of this invention resides in an improved float construction which is relatively simple to fabricate, and which is not subjected to corrosion or deterioration within the water closet.

A feature of this invention resides in the provision of a float control that can be readily adjusted so as an optimum minimum amount of water is required for flushing a bowl.

Another feature of this invention resides in the provision that the improved float construction can be adjusted vertically as well as longitudinally along a float control rod to provide an infinite control for the water level normally standing in a water closet.

In accordance with this invention, the foregoing objects, features and other advantages are attained by an improved float construction which is readily adapted to the standard water inlet fixtures commonly found in water closets currently in wide spread, present day, use. Essentially, the float construction comprises a floating rod provided with means whereby it is rendered readily detachable to the valve actuator of a standard valve construction used in such water closets. The float assembly comprises a suspension bar and float vertically adjustable along the length thereof. The float bar includes means for rendering the same slidably adjustable along the axial length of the float rod. Means are also provided on the suspension bar for fixing the vertically adjusted position of the float therealong. In accordance with this invention, the float is formed of a plastic cellular or foam material. The arrangement is such that the float can be vertically and laterally adjusted with respect to the float rod.

Other features and advantages will become more readily apparent when considered in view of the following specification and drawings in which, FIGURE 1 is a sectional side view of a water closet illustrating the improved float construction of the instant invention and showing two adjusted positions of the float for a high and low water level control.

FIGURE 2 is an enlarged detail view of the improved float construction shown in the arrangement of FIG. 1.

FIGURE 3 is a modified form of the invention.

FIGURE 4 is a section view taken along line 4—4 of FIG. 3.

FIGURE 5 is a sectional plan view of the float construction taken along line 5—5 of FIG. 3.

Referring to the drawings, there is shown in FIG. 1 a water closet tank of the type utilized in conjunction with a toilet bowl. It generally comprises of a tank portion 10 for containing a supply of water and a removable closure 11 therefor. As shown, a riser tube 12 is connected to the water inlet pipe 13. Supported on the upper end of the riser tube 12 so as to be normally disposed above the water level is a valve 14 for controlling the flow of the water into the tank 10. As best shown in FIG. 2, a valve actuator 15 is pivotally connected to the valve body 14A. One end 15A of the actuator 15 is operatively connected to the valving member 16 for controlling the opening and closing of the valve 14, and the other end 15B thereof is adapted to receive a float rod 17.

A float control is utilized for actuating the valve actuator to effect opening and closing of the valve in accordance with water level. In the form of the invention as disclosed in FIG. 2, the float control means comprises the float rod 17 which is threaded at both ends, with one end of the rod being threaded into a tapped bore formed in the end 15B of the valve actuator 15. Thus the float rod 17 is rendered readily detachable from the valve actuator 15. Slidably adjusted along the length of the float rod 17 is a float suspension bar 18. In the form of the invention of FIGS. 1 and 2, the float suspension bar 18 comprises a wire rod or the like having a looped end portion 18A to define an eye for receiving the float rod 17. The arrangement is such that the suspension bar 18 is readily free to slide along the float rod 17. To fix the adjusted position of the suspension bar 18 along the float rod, a pair of nuts 19, 20 are provided, one on either side of the eye 18A. The suspension bar 18 can be readily fixed along the threaded end of the float rod simply by positioning the nuts 19, 20 accordingly. Thus with the bar 18 properly adjusted along the axial length of the float rod 17, the respective locating nuts 19, 20 are turned down onto the eye portion 18A of the bar 18 so as to maintain the same in fixed adjusted position therebetween.

The lower end of the suspension bar 18 is provided with a threaded portion 18B to which a stop nut 21 is threaded. In accordance with this invention, a plastic float 22 of cellular material, e.g., polystyrene or styrofoam is supported on the end thereof. As shown, the float 22 is substantially rectangular in shape and it is provided with a central bore 23 extending therethrough. Accordingly, a metallic washer 24 is countersunk into the surface of the float about the opening of the bore 23.

The arrangement is such that the suspension bar 18 is extended through the bore 23 of the float with the float rendered vertically adjusted or freely slidable along the length of the suspension rod. Accordingly, means are provided to fixedly secure the float 22 in vertical adjusted position along the bar 18. As shown the adjusting means includes a collar 25 slidably mounted on the suspension bar and the nut 21. The collar 25 in turn is set in adjusted position by a lock screw 26.

With the structure described, it will be readily apparent that the position of the float 22 can be horizontally and vertically adjusted so that the operation of the valve can be opened and closed for any desired water level conditions. Thus, where water is scarce, the operation of the valve 14 can be controlled in a manner which permits only the optimum minimum amount of water to be used.

FIGS. 3 to 5 illustrate a slightly modified form of the invention. In this form of the invention, the float rod 30 is required to be threaded at one end 30A thereof only. As shown in FIG. 4, the threaded end 30A is provided with upper and lower flats 31 so as to render the float rod 30 universally applicable with the known ballcocks. In this form of the invention, a sliding block or collar 32 is fitted to the rod 30. As shown in FIG. 3, the adjusting block 32 is provided with an axial bore 32A sized to render it freely slidably along the float rod 30. Disposed normal to the bore 32A is a top opening 32B which connects therewith. In accordance with this form of the invention, the suspension bar 33 is provided with a threaded portion at both ends thereof. One end 33A of the suspension bar is adapted to be threaded into the tap hole 32B of the sliding block 32. Accordingly, the suspension bar 33 functions as a stop for maintaining the adjusted position of the collar 32 along the axis of the rod 30. The lower threaded portion 33B of the bar is received in the bore 34 of the styrofoam float 35 formed as hereinbefore described. Accordingly, a pair of adjusting nuts 36, 37 are provided above and below the upper and lower surface of the float 35, respectively to maintain the float 35 in vertical adjusted position along the suspension bar 33. Thus it will be apparent that the float 35 can be adjusted both horizontally along the length of the float rod and also vertically along the length of the suspension bar 33. Thus by co-ordinating the horizontal and vertical adjustment of the float, the water level in the tank can be readily controlled for the optimum minimum requirements.

With the constructions described, it will be noted that the structure for controlling water level is relatively simple and free from any interference which will adversely effect the operation of the water closet. Consequently, the float construction of the instant invention is for all practical purposes trouble free, and the sticking of the valve is in opened position and is virtually all but eliminated. Also, due to the use of a styrofoam or cellular type float, 22, 35, the wear and leakage heretofore encountered in water closet floats is likewise eliminated.

While the instant invention has been described with reference to a particular embodiment thereof, variations and modifications may be made without departing from the spirit or scope of the invention.

What is claimed is:

A water closet comprising a tank and closure therefor, a water inlet pipe, a valve means connected to the upper end thereof to control the flow of water into said closet, a valve actuator for operating said valve, the improvement of (a) a float rod adapted to be readily detachably connected to said valve actuator,
(b) a slider having a hole therethrough for receiving said rod whereby said slider is rendered slidably adjustable along the entire length of said rod,
(c) said slider having a second opening disposed normal to the axis of said hole and in communication therewith,
(d) said second opening being internally threaded,
(e) a float suspension bar having a threaded end threaded into said second opening whereby said suspension bar engages said float rod and functions as a stop to positively retain said adjustable slider in fixed position along the length of said float rod,
(f) a styrofoam float having a bore extending therethrough,
(g) said suspension bar being adapted to extend through the bore of said float whereby said float is adjustable axially of said bar independently of the adjustment of said slider along the length of said float rod,
(h) washer means circumscribing said bore adjacent the top and bottom of said float,
(i) and means for securing said float in the vertical adjusted position thereof along said suspension bar.

References Cited

UNITED STATES PATENTS

| | | | |
|---|---|---|---|
| 1,972,331 | 9/1934 | Dean | 137—426 |
| 2,524,699 | 10/1950 | Friedl | 137—426 X |
| 3,055,387 | 9/1962 | Eagar | 137—445 X |
| 3,176,707 | 4/1965 | Wilson | 137—448 X |
| 3,202,173 | 8/1965 | Szwargulski | 137—426 |

WILLIAM F. O'DEA, *Primary Examiner.*

D. MATTHEWS, *Assistant Examiner.*